United States Patent
Herzberg et al.

(10) Patent No.: US 8,732,586 B2
(45) Date of Patent: May 20, 2014

(54) COMPLEX SYSTEM FUNCTION STATUS DIAGNOSIS AND PRESENTATION

(75) Inventors: Garry Gean Herzberg, Renton, WA (US); Timothy Edward Jackson, Mukilteo, WA (US); Tracy Andrew Smail, Seattle, WA (US); Charles Daniel Cowles, Kent, WA (US); Erin Elizabeth Warr, Kent, WA (US); Allen R. Link, Snohomish, WA (US); Mark D. McCleary, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 508 days.

(21) Appl. No.: 13/081,102

(22) Filed: Apr. 6, 2011

(65) Prior Publication Data

US 2012/0260180 A1 Oct. 11, 2012

(51) Int. Cl.
*G06F 3/14* (2006.01)

(52) U.S. Cl.
USPC ............ 715/736; 715/200; 715/700; 726/11; 370/419

(58) Field of Classification Search
USPC .......... 715/200–277, 700–867; 700/701–866; 709/201–229; 705/50–79; 345/30–111; 370/419; 726/11
See application file for complete search history.

(56) References Cited

U.S. PATENT DOCUMENTS

| | | | |
|---|---|---|---|
| 5,960,381 A | 9/1999 | Singers et al. | |
| 7,350,106 B2 | 3/2008 | Longere | |
| 2004/0205398 A1 | 10/2004 | Osborn et al. | |
| 2008/0049776 A1* | 2/2008 | Wiley et al. | 370/419 |
| 2010/0037099 A1 | 2/2010 | Lefebvre et al. | |
| 2011/0072506 A1* | 3/2011 | Law et al. | 726/11 |

OTHER PUBLICATIONS

U.S. Appl. No. 12/488,249, filed Jun. 19, 2009, Jackson.

* cited by examiner

*Primary Examiner* — Ruay Ho
(74) *Attorney, Agent, or Firm* — Yee & Associates, P.C.

(57) ABSTRACT

Status of complex system functions is diagnosed and reported by analyzing traffic on a data network of the complex system. The network traffic may be placed on the data network by systems that perform functions for the complex system. A user may make a view selection via a remote user interface. The view selection identifies rules for determining a status of a selected subset of the functions or a status of selected ones of the functions for a selected state of operation, such as during initial power-up. The status of the functions may be determined from the network traffic using the rules and presented to the user via the user interface. The user may interact with the presentation to make different view selections. Multiple different view selections made via multiple different user interfaces may be supported simultaneously.

31 Claims, 9 Drawing Sheets

COMPLEX SYSTEM FUNCTION STATUS DIAGNOSIS AND PRESENTATION

BACKGROUND INFORMATION

1. Field

The present disclosure relates generally to diagnosing the status of system functions and presenting the status to a user. More particularly, the present disclosure relates to determining the status of functions performed by or for a complex system, such as an aircraft, from traffic on a data network of the complex system, and presenting the status to a user via a user interface.

2. Background

A complex system may be defined as any system that is comprised of a number of systems. Each of the number of systems is designed to perform one or more functions for the complex system. When the number of systems is functioning properly, the complex system is functioning properly. Thus, the status of operation of a complex system may be determined by the status of operation of the various complex system functions.

The systems forming a complex system may include various data processing devices. These various data processing devices may be connected together via a data network. The data processing devices may place data on the data network and may receive data from the data network. The data network thus provides for communication between the various systems of the complex system. Communication between the systems provides for monitoring and control of the complex system by monitoring and control of the systems that form the complex system via the data network.

An aircraft is one example of a complex system. An aircraft may include a number of systems. These systems may be in communication with each other via a data network on the aircraft. For example, modern aircraft use data communication buses to share command, control, and state information between various systems within the aircraft. Other examples of complex systems include other vehicles, such as spacecraft, land vehicles, and water vehicles. Non-vehicular examples of complex systems include power plants, manufacturing facilities, and the like. Any such complex system may use one or more data networks to provide communication between the various systems that form the complex system.

An example of a data network used to provide communication between systems on an aircraft is an aircraft data network. For example, Aeronautical Radio Inc. 664, ARINC 664, is a standard for an aircraft data network used in commercial and transport aircraft. This standard defines physical and electrical interfaces of a data network and a data protocol for an aircraft's local area network. The ARINC 664 standard is based on the IEEE 802.3 network standard and uses commercial off-the-shelf hardware.

The Avionics Full Duplex Switched Ethernet network, AFDX, is built on the ARINC 664 standard. AFDX uses a switch tied to a number of end systems or line replaceable units. Each end system may be bridged using other switches on the network. The communications traffic between aircraft systems on the AFDX network is primarily in the form of uni-cast and multi-cast datagrams. AFDX provides dual redundancy to increase availability on connectionless datagram communication. AFDX uses less wiring than many previous commercial aircraft networks. Since AFDX is full duplex, data can travel across a single set of wires in both directions simultaneously. In previous aircraft networks, such as ARINC 429, a network would be established for each transmitting system or device.

SUMMARY

An embodiment of the present disclosure provides a method for system diagnosis and status reporting. Network traffic is received from a data network of a complex system. The network traffic is placed on the data network by a number of systems that may perform a number of functions for the complex system. A view selection is received. The view selection identifies rules for determining a status of selected ones of the number of functions from the network traffic. Responsive to receiving the view selection, the status of the selected ones of the number of functions is determined from the network traffic using the rules. The determined status of the selected ones of the number of functions then may be provided to a user interface.

Another embodiment of the present disclosure provides an apparatus comprising a network interface and a network analyzer. The network interface is configured to receive network traffic from a data network. The network traffic is placed on the data network by a number of systems that may perform a number of functions for a complex system. The network analyzer is connected to the network interface. The network analyzer is configured to receive a view selection. The view selection identifies rules for determining a status of selected ones of the number of functions from the network traffic. The network analyzer also is configured to determine the status of the selected ones of the number of functions from the network traffic using the rules, responsive to receiving the view selection. The network analyzer also may be configured to provide the determined status of the selected ones of the number of functions to a user interface.

Another embodiment of the present disclosure provides a computer program product for system diagnosis and status reporting. The computer program product comprises program instructions stored on a computer readable storage medium. The program instructions may include first program instructions to receive network traffic from a data network. The network traffic may be placed on the data network by a number of systems that perform a number of functions for a complex system. The program instructions may include second program instructions to receive a view selection. The view selection identifies rules for determining a status of selected ones of the number of functions from the network traffic. The program instructions may include third program instructions to determine the status of the selected ones of the number of functions from the network traffic using the rules, responsive to receiving the view selection. The program instructions may include forth program instructions to provide the status of the selected ones of the number of functions to a user interface.

Another embodiment of the present disclosure provides a complex system comprising a number of systems. The number of systems may perform a number of functions for the complex system. A data network is connected to the number of systems. The number of systems place network traffic on the data network. A network interface is connected to the data network and configured to receive the network traffic from the data network. A network analyzer is connected to the network interface and configured to receive a view selection. The view selection identifies rules for determining a status of selected ones of the number of functions from the network traffic. The network analyzer also is configured to determine the status of the selected ones of the number of functions from the network traffic using the rules, responsive to receiving the view selection. A user interface may be connected to the network analyzer and configured to generate a presentation of the status of the selected ones of the number functions. The view selection may be received by the network analyzer from the user interface.

Various features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment read in conjunction with the accompanying drawings, wherein:

DETAILED DESCRIPTION

Figure 1:
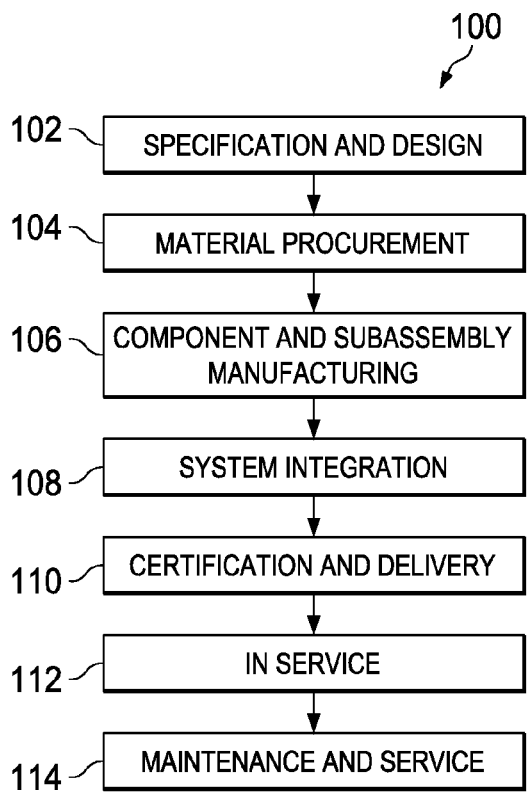
FIG. 1 is an illustration of an aircraft manufacturing and service method in accordance with an advantageous embodiment.
Figure 2:
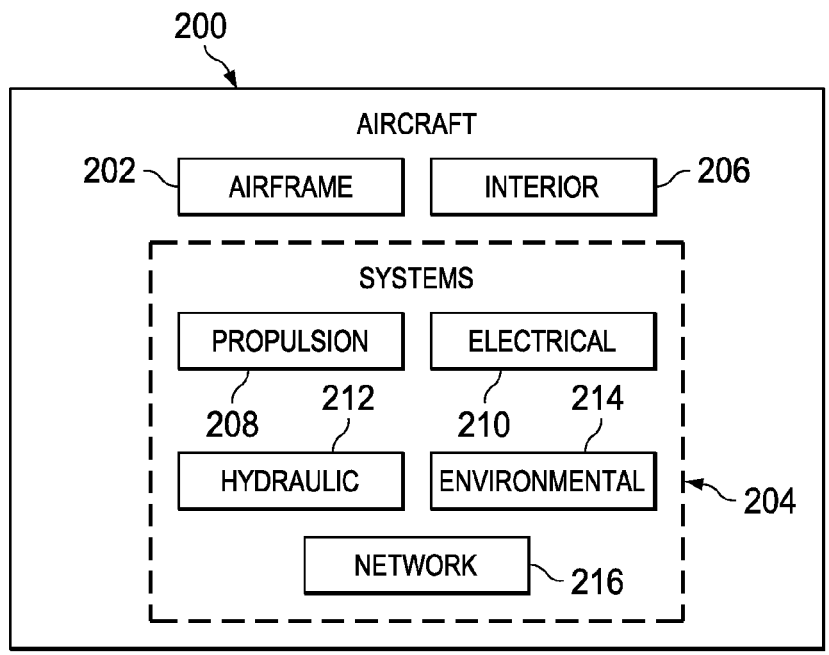
FIG. 2 is an illustration of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and network system 216. For example, network system 216 may comprise an aircraft data network. Any number of other systems may be included.

Apparatus and methods embodied herein may be employed during at least one of the stages of aircraft manufacturing and service method 100 in FIG. 1. In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200. Although an aerospace example is shown, different advantageous embodiments may be applied to other industries, such as the automotive industry.

The different advantageous embodiments recognize and take into account a number of different considerations. For example, the different advantageous embodiments recognize and take into account that internal health monitoring systems that are available when an aircraft is fully up and running cannot be relied upon to provide a useful indication of the status of aircraft functions at other times during other aircraft states of operation. Such internal health monitoring systems cannot be relied upon to provide a useful indication of aircraft function status while the aircraft is going through its initial power-up for the first time in the factory, for example. In this case, aircraft internal health monitoring systems cannot be relied upon to provide useful information because functionality of the underlying aircraft wiring, software, and systems upon which such internal health monitoring systems may rely may not have been verified. As an aircraft is initially powered up to the point where critical systems have established normal operational functionality, there may be numerous functional conditions at end points, switches, circuit breakers, fiber and copper breaks, and load shedding, etc., that may be difficult to identify quickly using current internal health monitoring systems and methods.

The different advantageous embodiments also recognize and take into account the difficulty of identifying accurately the status of aircraft system functions. The true status of an aircraft system function can be masked by occurrences or conditions that are not necessarily related to the status of that function. For example, functional inconsistencies of one or more other systems, communications interruptions, automated load shedding, or other occurrences can mask the true status of a system function of interest. This masking of system function status slows down the process for verifying the status of aircraft functions and increases the time for aircraft system validation. Reducing the time required for validating the functionality of aircraft systems becomes important as aircraft manufacturers move to improve flow time in the factory.

The different advantageous embodiments recognize and take into account that, as part of a manufacturing, maintenance, or repair operation, a mechanic may rely on external aids to diagnose the status of system functions on highly networked aircraft. Many of the diagnostic tools currently in use to analyze a given aircraft system or systems are tailored for use by individuals with the knowledge and level of expertise of a systems engineer. The mechanic at work on the factory floor or in a maintenance and repair facility currently has available few tools that provide aircraft system or function status information in an easy to understand and user friendly manner. What is desired, therefore, is a system that provides an easy to understand visual presentation of aircraft system function status. Such a system allows a mechanic to scan the presentation to determine quickly the status of various aircraft functions. Such a system allows the mechanic to focus efforts on aircraft functions having a particular status that may require attention.

The different advantageous embodiments also recognize and take into account that the latest aircraft network architectures are revolutionary in comparison to previous aircraft network architectures. Previously, aircraft data networks were based on a single transmitter multi-receiver based standard or a bus-oriented architecture. Furthermore, previous aircraft data networks were based on copper wire transmission media. More recent systems employ fiber optic transmission media. Thus, more advanced aircraft data networks present system components and operational modes that were not present in earlier aircraft. Therefore, the latest aircraft data networks themselves create new challenges for diagnosing the status of aircraft functions. For example, previously a mechanic might probe a network connection with an analyzer device to determine whether or not data is appearing at the input or output of an aircraft system. However, fiber cables and switches not only can be working or not working but also may drop a percentage of data traffic. In earlier aircraft, a data bus did not have switching components that can drop, delay, or intermittently drop messages in the same number and frequency as has been experienced with newer systems. This behavior of newer aircraft network systems causes the status of a function at an application level to be harder to identify and diagnose.

In accordance with an advantageous embodiment, diagnosis and presentation of the status of functions in a complex system may employ a specialized network analyzer in combination with a user interface. The network analyzer captures traffic on a data network of the complex system. The captured network traffic is analyzed by the network analyzer using selected rules to diagnose the status of functions of interest to a user. The user interface allows a user to select a view of the system functions for which status is to be determined and presented. The user's view selection identifies to the network analyzer the rules that will be used to determine the status of the functions of interest. The determined status of the functions may be provided to the user interface for presentation to the user. The determined status of system functions of interest may be presented to the user in a user friendly and interactive manner.

In accordance with an advantageous embodiment, the user's view selection identifies both the functions for which status is to be determined and presented and the manner in which such status will be determined from network traffic. For example, the view selection may identify a particular subset of system functions of interest. This allows the user to focus on a particular portion of a complex system that is being evaluated, for example. In this case, the rules for determining the status of the functions of interest may determine the status of the functions of interest from network traffic in a manner that prevents traffic on the network from other systems and functions from effecting an inaccurate determination of the status of the functions of interest. The view selection also may identify a particular state of operation of the complex system for which the status of functions is to be determined. In this case, the rules for determining the status of the functions of interest may determine the status of the functions of interest from network traffic in a manner that is relative to the state of operation. For example, network traffic may be analyzed using one set of rules to determine function status during initial power-up of the complex system and a different set of rules to determine function status when the complex system is in a fully operational condition.

Figure 3:
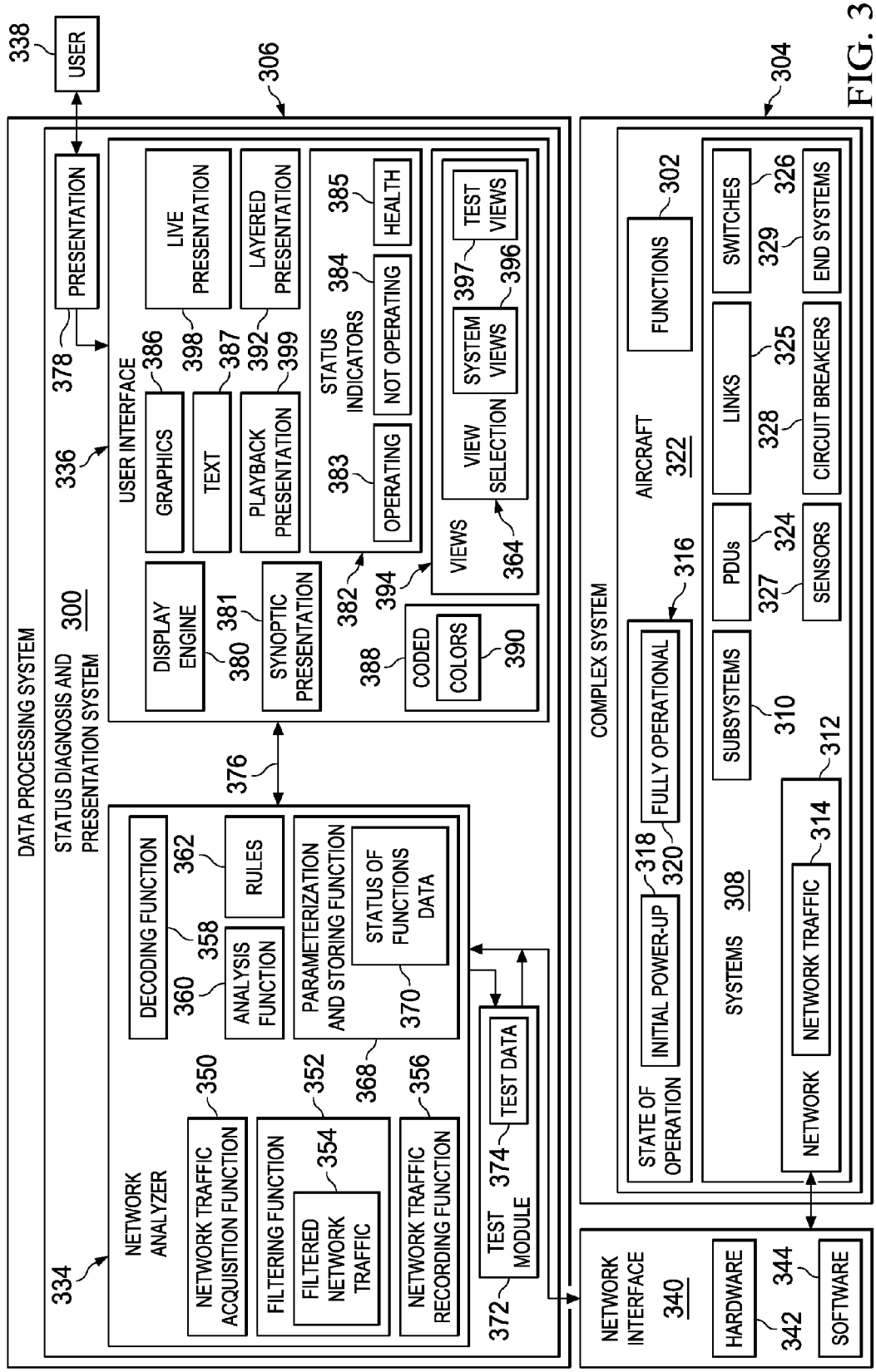
FIG. 3 is a block diagram of an apparatus for complex system function status diagnosis and presentation in accordance with an advantageous embodiment.

Turning now to FIG. 3, a block diagram of an apparatus for complex system function status diagnosis and presentation in accordance with an advantageous embodiment is presented. In accordance with an advantageous embodiment, status diagnosis and presentation system 300 may be used to determine and display the status of functions 302 of complex system 304. The functionality of status diagnosis and presentation system 300, to be described herein, may be implemented in data processing system 306.

Complex system 304 may comprise number of systems 308. Number of systems 308 performs number of functions 302 for complex system 304. Number of systems 308 may comprise number of subsystems 310. The nature and implementation of functions 302, systems 308, and subsystems 310 depends on the nature of complex system 304 and functions 302 to be performed by systems 308 and subsystems 310 for complex system 304. For example, individual systems 308 or subsystems 310 may perform one or more functions 302. In accordance with an advantageous embodiment, status diagnosis and presentation system 300 may be used to diagnose and present the status of selected functions 302. Since functions 302 are performed by systems 308 or subsystems 310, the status of selected functions 302 may also represent the status of related systems 308 or subsystems 310. Thus, references to the status of "functions" in this document, including in the specification and claims, should be interpreted to include additionally, or alternatively, the status of systems or subsystems that perform such functions. As used herein, the "status" or "operational status" of a function, system, or subsystem may also be referred to as the "health" of the function, system, or subsystem.

In accordance with an advantageous embodiment, complex system 304 may be any system that comprises number of systems 308 and network 312. Network 312 may be implemented as any data network that provides for communication between or among systems 308. Various devices and structures forming network 312 may themselves form one or more of systems 308.

Systems 308 may communicate with each other via network 312 by placing data on network 312, receiving data from network 312, or both. Systems 308 may place data on network 312 or receive data from network 312 either directly or indirectly. For example, systems 308 may comprise data processing systems or other devices configured to place data on network 312 or to receive data from network 312 using the appropriate network protocols and interfaces. Alternatively, systems 308 may place data on network 312 or receive data from network 312 via intermediate systems that provide the appropriate interfaces between systems 308 and network 312.

Data placed on network 312 by systems 308 forms network traffic 314. In accordance with an advantageous embodiment, systems 308 may place data on network 312 in the form of data packets. In this case, network traffic 314 is the traffic of such data packets on network 312.

Operation of complex system 304 at any point in time may be defined by state of operation 316. For example, as complex system 304 is being brought into operation, state of operation 316 may transition from initial power-up 318 to fully operational 320, with many sub-states of operation in between. The amount of time spent in any particular state of operation 316 may depend on the situation. For example, if the transition from initial power-up 318 to fully operational 320 is occurring as part of a production process or major overhaul, much time may be spent in various states of operation before fully operational 320. In this case, extended dwelling time in various states of operation may be used to validate operation of various systems 308, subsystems 310, and functions 302 at various states of operation as complex system 304 is brought into full operation. Network traffic 314 placed on network 312 by systems 308 may vary with state of operation 316 of complex system 304. Furthermore, the definition of the status of functions 302 may vary with state of operation 316 of complex system 304. For example, a certain level of functionality of one of functions 302 during initial power-up 318 may indicate a status of "healthy" for that function at that state of operation 316. However, that same level of functionality may indicate a different status for that function at fully operational 320 or at another state of operation 316 of complex system 304.

In accordance with an advantageous embodiment, complex system 304 may be a vehicle. For example, complex system 304 may be aircraft 322. Examples of other vehicular complex systems include a spacecraft, a land vehicle, or a water vehicle. Alternatively, complex system 304 may be a non-vehicular system. For example, without limitation, complex system 304 may be a power plant, manufacturing facility, command and control center for military or civilian operations, or the like.

An advantageous embodiment is described in detail herein with reference to an example of the diagnosis and presentation of the status of functions 302 of aircraft 322. In this example, aircraft 322 is an example of one implementation of aircraft 200 in FIG. 2. However, advantageous embodiments are not limited to applications with aircraft 322. Advantageous embodiments may find applications with other complex systems.

Aircraft 322 includes systems 308 for performing various aircraft functions 302. The nature and implementation of aircraft systems 308 will depend upon the particular aircraft for which systems 308 are implemented and the particular aircraft functions 302 to be performed. Examples of aircraft systems 308 may include, for example and without limitation, power distribution units 324, links 325, switches 326, sensors 327, circuit breakers 328, and other end systems 329. Aircraft 322 may include more, fewer, or different systems 308 from those illustrated. Each of such aircraft systems 308 may include one or more subsystems 310. Each of such aircraft systems 308 may perform one or more aircraft functions 302.

Network 312 may be an Avionics Full Duplex Switched Ethernet network built on the ARINC 664 standard. Alternatively, network 312 may be another aircraft data network or other network implemented using commercial off-the-shelf components. Network 312 may employ fiber optic transmission media, copper wire transmission media, or both, for transporting network traffic 314 on network 312.

In accordance with an advantageous embodiment, status diagnosis and presentation system 300 may comprise network analyzer 334 and user interface 336. Network analyzer 334 obtains network traffic 314 from network 312 of complex system 304 and performs functions for determining the status of complex system functions 302 from network traffic 314. User interface 336 receives input for network analyzer 334 from user 338 and presents the status of functions determined by network analyzer 334 to user 338 in a user friendly and easy to understand manner.

Network analyzer 334 may obtain network traffic 314 from network 312 via network interface 340. Network interface 340 may comprise hardware 342 and software 344 as needed to provide a physical and functional link between status diagnosis and presentation system 300 and network 312. For example, hardware 342 may include appropriate devices or structures for making a physical connection to network 312. Hardware 342, software 344, or both, may implement the appropriate protocols for accessing network traffic 314 on network 312 by network analyzer 334. Specific implementation of network interface 340 in any particular application will depend, for example, on how network 312 and network traffic 314 are implemented in that application. In one example, some or all of the functionality of network interface 340 may be incorporated as part of status diagnosis and presentation system 300. In another example, some or all of the functionality of network interface 340 may be provided by one or more devices or systems that are separate from status diagnosis and presentation system 300 but that are connected between status diagnosis and presentation system 300 and network 312 of complex system 304.

In accordance with an advantageous embodiment, network interface 340 may provide two-way communication. Thus, in addition to providing for obtaining network traffic 314 from network 312 of complex system 304 by network analyzer 334, network interface 340 may provide for placing data on network 312 by status diagnosis and presentation system 300. For example, network interface 340 may provide an interface for status diagnosis and presentation system 300 to place data packets on network 312 or otherwise to communicate with systems 308 of complex system 304 via network 312.

Network analyzer 334 may perform various functions for determining the status of functions 302 of complex system 304 from network traffic 314. These functions may include, for example, network traffic acquisition function 350, filtering function 352, network traffic recording function 356, decoding function 358, analysis function 360, and parameterization and storing function 368.

Network traffic acquisition function 350 may control the acquisition of network traffic 314 for use by other functions of network analyzer 334. For example, network traffic acquisition function 350 may control when live network traffic 314 from network 312 is received for use by network analyzer 334. In some cases, the analysis implemented by network analyzer 334 may be performed using recorded, rather than live, network traffic 314. In this case, network traffic acquisition function 350 may control receiving recorded network traffic 314 for use by network analyzer 334. For example, network traffic acquisition function 350 may control the playback of recorded network traffic 314 for use by network analyzer 334.

In accordance with an advantageous embodiment, network analyzer 334 may receive all or substantially all of network traffic 314 on network 312 at any given time. At least some, and perhaps much, of network traffic 314 may not be relevant to diagnosing the status of selected complex system functions 302 by network analyzer 334 at any given time. Network analyzer 334 may include filtering function 352. Filtering function 352 may be used to filter the stream of network traffic 314 received by network analyzer 334 to remove portions of network traffic 314 that are not used by the diagnosis operations being performed by network analyzer 334. For example, filtering function 352 may remove data packets from the stream of network traffic 314 received by network analyzer 334 that are not relevant to determining the status of selected functions 302 of interest.

After filtering by filtering function 352, the remaining portion of network traffic 314 forms filtered network traffic 354. Filtered network traffic 354 thus may contain only, or substantially only, the portion of network traffic 314 that is relevant to determining the status of selected functions 302. For example, filtered network traffic 354 may include only, or substantially only, data packets containing information that will be used by the diagnosis related functions of network analyzer 334.

Network traffic recording function 356 may control the recording and storage of network traffic 314 that is received for use by network analyzer 334. Network traffic recording function 356 may record network traffic 314 as it is received live by network analyzer 334 via network interface 340. In this case, when the diagnosis performed by network analyzer 334 is to be performed using network traffic 314 recorded by network traffic recording function 356, filtering function 352 may be applied to the recorded network traffic 314 before it is used by other functions of network analyzer 334. Alternatively, network traffic recording function 356 may record filtered network traffic 354 that is obtained after network traffic 314 is filtered by filtering function 352. In accordance with another illustrative embodiment, network traffic recording function 356 may record both unfiltered network traffic 314 and filtered network traffic 354, as desired.

Decoding function 358 may be used to extract from network traffic 314 and filtered network traffic 354 the information that is used by network analyzer 334 to determine the status of functions 302 of complex system 304. For example, network traffic 314 and filtered network traffic 354 may comprise data packets that contain therein information to be used by analysis function 360 to determine that status of selected functions 302. In this case, decoding function 358 may be used to decode the data packets to extract from the data packets the information to be used by analysis function 360. The operation of decoding function 358 in any particular application will depend upon how the information to be used by analysis function 360 is coded in network traffic 314 or in filtered network traffic 354.

Analysis function 360 may comprise a number of functions for determining the status of selected functions 302 of complex system 304 from network traffic 314 or filtered network traffic 354. Analysis function 360 may use the information provided by decoding function 358 to determine the status of selected functions 302. Analysis function 360 determines the status of selected functions 302 by applying selected rules 362 to network traffic 314. Rules 362 may also be referred to as algorithms for determining the status of selected functions 302 from network traffic 314. The implementation of analysis function 360 for any particular application will depend on particular functions 302 to be diagnosed and on what network traffic 314 placed on network 312 by systems 308 may reveal regarding the operational status of functions 302.

Rules 362 used to determine the status of selected functions 302 from network traffic 314 in any given case may be identified by view selection 364. As will be described in more detail below, view selection 364 may be made by user 338 using user interface 336. View selection 364 may be provided from user interface 336 to network analyzer 334 for use by network analyzer 334 in identifying rules 362 for determining the status of selected ones of functions 302 from network traffic 314. For example, rules 362 may comprise multiple groups or sets of rules 362. These multiple groups or sets of rules may be defined in advance and stored in a database or otherwise implemented for use by network analyzer 334. Each such group or set of rules 362 may comprise rules 362 for determining the status of selected ones of functions 302 from network traffic 314 that correspond to a different possible view selection 364. By providing the desired view selection 364 to network analyzer 334, the appropriate group or set of rules 362 may be identified and used by analysis function 360 to determine the status of the selected functions 302.

In accordance with an advantageous embodiment, view selection 364 may identify particular selected ones of functions 302 for which status is to be determined, a particular state of operation 316 for which the status of selected ones of functions 302 is to be determined, or both. In any case, view selection 364 identifies appropriate rules 362 to be used to determine status for the particular ones of functions 302 from network traffic 314 for the particular state of operation 316.

For example, view selection 364 may identify a selected proper subset of functions 302 performed for complex system 304 for which a status determination is desired. A proper subset of functions 302 is a subset of functions 302 that does not include all of functions 302 performed for complex system 304. For example, view selection 364 may identify only functions 302 related to one portion of complex system 304 or functions related to a group of systems 308 of complex system 304. By limiting the set of functions 302 for which status is determined and presented, user 338 may focus on specific functions of interest at a particular time. In accordance with an advantageous embodiment, rules 362 corresponding to view selection 364 may take into account that the status of only a particular subset of functions 302 is of interest. Thus, rules 362 identified by view selection 364 in this case may be used to determine the status of functions 302 of interest from network traffic 314 in a manner that prevents network traffic 314 on network 312 from unrelated systems 308 and functions 302 from effecting an inaccurate determination of the status of the functions of interest.

As another example, view selection 364 may identify a particular state of operation 316 for which the status of functions 302 is to be determined. For example, view selection 364 may indicate that the status of functions 302 is to be determined for initial power-up 318 of complex system 304 or of selected systems 308 of complex system 304. Alternatively, view selection 364 may indicate that status of functions 302 is to be determined for fully operational 320 or some other state of operation 316 of complex system 304 or of a portion of complex system 304. By indicating state of operation 316 for which the status of functions 302 is to be determined, the status of functions 302 may be determined accurately relative to the current state of operation 316. As mentioned above, status of functions 302 may be defined differently for the same functionality of functions 302 at different states of operation. Rules 362 for determining the status of functions 302 from network traffic 314 thus may take into account state of operation 316 identified by view selection 364.

Rules 362 define how the status of functions 302 will be determined from network traffic 314 for view selection 364. Thus, rules 362 may define algorithms to be used to determine status of functions 302 from network traffic 314 as well as characteristics of network traffic 314 that will be used to determine status of functions 302. Such algorithms and characteristics likely will be different for each different view selection 364. For example, different algorithms and different characteristics of network traffic 314 may be use to determine status of functions 302 for different subsets of functions 302 and for each different state of operation 316.

Different characteristics of network traffic 314 that may be used to determine the status of functions 302 for view selection 364 may include, for example, whether or not selected data is available in network traffic 314, the content of selected data in network traffic 314, the validity of selected data in network traffic 314, or other characteristics of network traffic 314 either alone or in any combination. Since rules 362 define the relevant portion and characteristics of network traffic 314 that will be used to determine the status of functions 302 for view selection 364, rules 362 may be used to control the filtering of network traffic performed by filtering function 352, the decoding of network traffic performed by decoding function 358, or both.

The product of analysis function 360 is a determination of the status of selected ones of functions 302. This determination may be provided to parameterization and storing function 368. Parameterization and storing function 368 processes the determined status of functions 302 from analysis function 360 into status of functions data 370. Status of functions data 370 provides the status of functions 302 determined by network analyzer 334 in a format for use by user interface 336.

Network analyzer 334 may generate status of functions data 370 in the manner described by passively receiving network traffic 314 that is placed on network 312 by systems 308 and analyzing network traffic 314 using appropriate rules 362. Status diagnosis and presentation system 300 also may actively conduct or initiate testing of systems 308 in order to determine the status of functions 302. In this case, status diagnosis and presentation system 300 may include test module 372. Test module 372 may be implemented as an integral part of network analyzer 334 or as an entirely separate or partial add-on to network analyzer 334.

Test module 372 may initiate or conduct testing of one or more systems 308 by sending test data 374 to one or more systems 308 via network 312. For example, test data 374 may be sent to systems 308 via the connection to network 312 provided by network interface 340. Test data 374 may include, for example, a signal or data that causes one or more of systems 308 to enter into a testing state or to conduct a test sequence. In general, test data 374 may include any data that is designed to elicit a response from one or more systems 308 that includes generating network traffic 314 from which the status of one or more selected functions 302 may be determined. Network traffic 314 resulting from a test initiated or conducted by test module 372 may be received and analyzed by network analyzer 334 to generate status of functions data 370 in the manner described above.

Test module 372 may initiate or conduct a test in response to a request from network analyzer 334. For example, one or more rules 362 identified by view selection 364 may indicate that active testing of one or more systems 308 is required or desired in order to determine or confirm the status of functions 302. In this case, network analyzer 334 may request test module 372 to initiate or conduct the required test as defined by rules 362.

In accordance with an advantageous embodiment, user interface 336 provides an interactive interface for user 338. User interface 336 provides an interface for presenting to user 338 the status of functions 302 determined by network analyzer 334. User interface 336 also may provide an interface for receiving view selection 364 from user 338. User interface 336 may be implemented using any appropriate combination of hardware and software components for implementing the functions of user interface 336 described herein. For example, user interface 336 may be implemented as part of data processing system 306. For example, without limitation, user interface 336 may be implemented on a portable or handheld computing device.

User interface 336 may be integrated with network analyzer 334 or may be implemented separately from network analyzer 334. If user interface 336 is implemented separately from network analyzer 334, user interface 336 may be located with network analyzer 334 or located remotely from network analyzer 334. Connection 376 may be used to provide communication of data between user interface 336 and network analyzer 334. For example, view selection 364 and other data may be provided from user interface 336 to network analyzer 334 via connection 376. Status of functions data 370 and other data may be provided from network analyzer 334 to user interface 336 via connection 376. Connection 376 may be implemented using wired or wireless connections, or both. Connection 376 may be implemented using a network connection, such as a local area network, a wide area network, or the Internet.

In accordance with an advantageous embodiment, user interface 336 may present to user 338 the status of functions 302, as determined by network analyzer 334, in the form of presentation 378. As will be discussed in more detail below, the status of functions 302 may be presented in an interactive manner using appropriate color graphics. Presentation 378 may be provided using any combination of hardware, firmware, and software that provides for adequate rendering of, and user interaction with, presentation 378. For example, presentation 378 may be provided using a monitor or other display, appropriate graphics drivers for the display, and a device for receiving user input. Examples of appropriate devices for receiving user input include, without limitation, a keyboard or keypad, a mouse, and a touch screen.

User interface 336 may comprise display engine 380. In accordance with an advantageous embodiment, display engine 380 generates presentation 378 of the operational status of functions 302 from status of functions data 370 received from network analyzer 334. Display engine 380 may be implemented using any combination of software and hardware to generate presentation 378 as described herein.

Presentation 378 may comprise synoptic presentation 381 of the status of functions 302. By presenting a general view or summary of the status of functions 302, user 338 may be able to determine quickly the status of complex system 304 as a whole as well as the operational status of systems 308 that form complex system 304. Synoptic presentation 381 may present status of functions 302 in a form that may be understood and used easily by individuals possessing various degrees of skill, expertise, and experience.

Presentation 378 may present status of functions 302 using summary status indicators 382. For example, without limitation, status of functions 302 may be presented by indicating whether functions 302 are operating 383 or not operating 384. If functions 302 are operating 383, a general or summary indication of health 385 of such functions 302 may be presented. For example, health 385 may indicate the degree or level of functionality at which functions 302 are operating.

Status of functions 302 may be presented using status indicators 382 in addition to, or that are different from, those described by example herein.

Presentation 378 may present the status of functions 302 in a quickly and easily understood form using graphics 386, text 387, or a combination of graphics 386 and text 387. For example, the status of functions 302, as indicated by status indicators 382, may be graphically coded 388. Each of status indicators 382 may be represented by a different graphical representation. For example, status indicators 382 may be coded using colors 390. A status of operating 383 may be indicated using a first color with a status of not operating 384 indicated using a second color that is different from the first color. A variety of different colors may be used to indicate various levels or degrees of health 385. Alternatively, or additionally, status indicators 382 may be coded 388 using graphical representations other than colors 390. For example, status indicators 382 may be coded 388 by one or more of framing, shading, highlighting, patterns, shapes, and other graphical representations.

Presentation 378 of the status of functions 302 may include user interactive layered presentation 392. Layered presentation 392 allows user 338 to view the status of functions 302 at various levels within complex system 304. For example, the status of selected functions 302 may be presented to user 338 in summary form using status indicators 382 in the manner described. In response to selecting one of the presented status indicators 382 by user 338, the status of various other ones of functions 302 may be determined and presented to user 338. In this example, the first status indicators 382 presented may show the status of functions 302 related to selected systems 308 of complex system 304. Second status indicators 382 may then be used to indicate the status of functions 302 related to selected subsystems 310 of a selected one of the selected systems 308. This process may be repeated by user 338 to determine and present the status of functions 302 at multiple levels of complex system 304.

User interface 336 may generate an appropriate view selection 364 in response to user 338 selecting one of status indicators 382 in the manner described, to determine the status of functions 302 at another level in complex system 304. This new view selection 364 then may be sent to network analyzer 334 to generate status of functions data 370 for the functions of interest.

In accordance with an advantageous embodiment, user 338 may select view selection 364 from among various pre-defined views 394. Available views 394 may be grouped by different types. For example, without limitation, view selection 364 may be selected from among one or more system views 396 or test views 397. In system views 396 the status of a number of functions 302 related to particular systems 308 may be determined and presented to user 338. In test views 397 the status of a number of functions 302 related to systems 308 that are under test or at another particular state of operation 316 may be determined and presented to user 338. Other advantageous embodiments may provide different or additional types of views 394 from which view selection 364 may be selected.

User interface 336 may be configured to allow user 338 to select live presentation 398 or playback presentation 399. If live presentation 398 is selected, presentation 378 may be a real time or near real time presentation of the status of functions 302. In this case, the determined and presented status of functions 302 may be based on network traffic 314 as it is received and analyzed by network analyzer 334. Presentation 378 of the status of functions 302 may reflect the latest status of functions data 370 generated by network analyzer 334 based on the received stream of network traffic 314.

As part of its analysis, network analyzer 334 may determine that a change in network traffic 314 indicates a change in status of one or more functions 302. In this case, network analyzer 334 may push changed status of functions data 370 to user interface 336 when such a change in the status of functions 302 is determined. User interface 336 may automatically update presentation 378 in response to receiving the changed status of functions data 370 from network analyzer 334. In this manner, presentation 378 may automatically show the most current determined status of functions 302, without requiring user 338 to manually request a refresh of status of functions data 370 from network analyzer 334. In other embodiments, user 338 may be required to request updating of status of functions data 370.

If playback presentation 399 is selected, presentation 378 may be a presentation of the status of functions 302 that is not based on current network traffic 314. Playback presentation 399 may be selected to present the status of functions 302 at a time or over a time period in the past. For example, playback presentation 399 may be based on recorded network traffic 314 or recorded filtered network traffic 354 that was recorded by network traffic recording function 356 and that is played back for use by network analyzer 334. Alternatively, playback presentation 399 may be generated by display engine 380 from recorded status of functions data 370. If user 338 selects playback presentation 399, user 338 may select or specify a past time period for playback presentation 399. Alternatively, user 338 may select or identify a source of the data to be used for playback presentation 399. These selections may be made by user 338 via user interface 336.

The illustration of FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, interactive presentation 378 generated by status diagnosis and presentation system 300 may be displayed or made available for display on a variety of different devices and via a variety of different media. Status diagnosis and presentation system 300 may be connected to a network, such as a local area network, a wide area network, or the internet. In this case, user 338 may interact with status diagnosis and presentation system 300 from a remote location using a device connected to the network. In another example, user 338 may interact with status diagnosis and presentation system 300 via a device connected by a wireless connection to status diagnosis and presentation system 300. A handheld wireless device may be used for this purpose, for example.

For some applications, status diagnosis and presentation system 300 may be provided as a mobile system. For example, status diagnosis and presentation system 300 may be provided on a mobile structure, such as a mobile cart. Other components, such as components needed to connect status diagnosis and presentation system 300 to complex system 304, also may be provided on the mobile structure. For example, the components of network interface 340 also may be provided on the mobile structure. To determine the status of functions 302, user 338 may move status diagnosis and presentation system 300 on the mobile structure into the desired position with respect to complex system 304. User 338 may then connect status diagnosis and presentation system 300 to complex system 304. After determining the status of functions 302, user 338 may disconnect status diagnosis and presentation system 300 from complex system 304. Status diagnosis and presentation system 300 then may be moved on the mobile structure away from complex system 304. An example of an application where status diagnosis and presentation system 300 may be provided on a mobile structure in this manner is where complex system 304 is aircraft 322 under construction or repair.

In accordance with an advantageous embodiment, status diagnosis and presentation system 300 may support multiple views and multiple users simultaneously. For example, one or more users may connect simultaneously to network analyzer 334 using one or more user interfaces. Each such user may make one or more view selections that are provided to network analyzer 334. Each of the view selections may identify different rules 362 for determining the status of selected ones of functions 302. Network analyzer 334 may determine the status of functions 302 using the various different rules 362 identified by the various view selections. Network analyzer 334 then may send updated status of functions data 370 back to the appropriate user interfaces from which the corresponding view selections were received.

Figure 4:
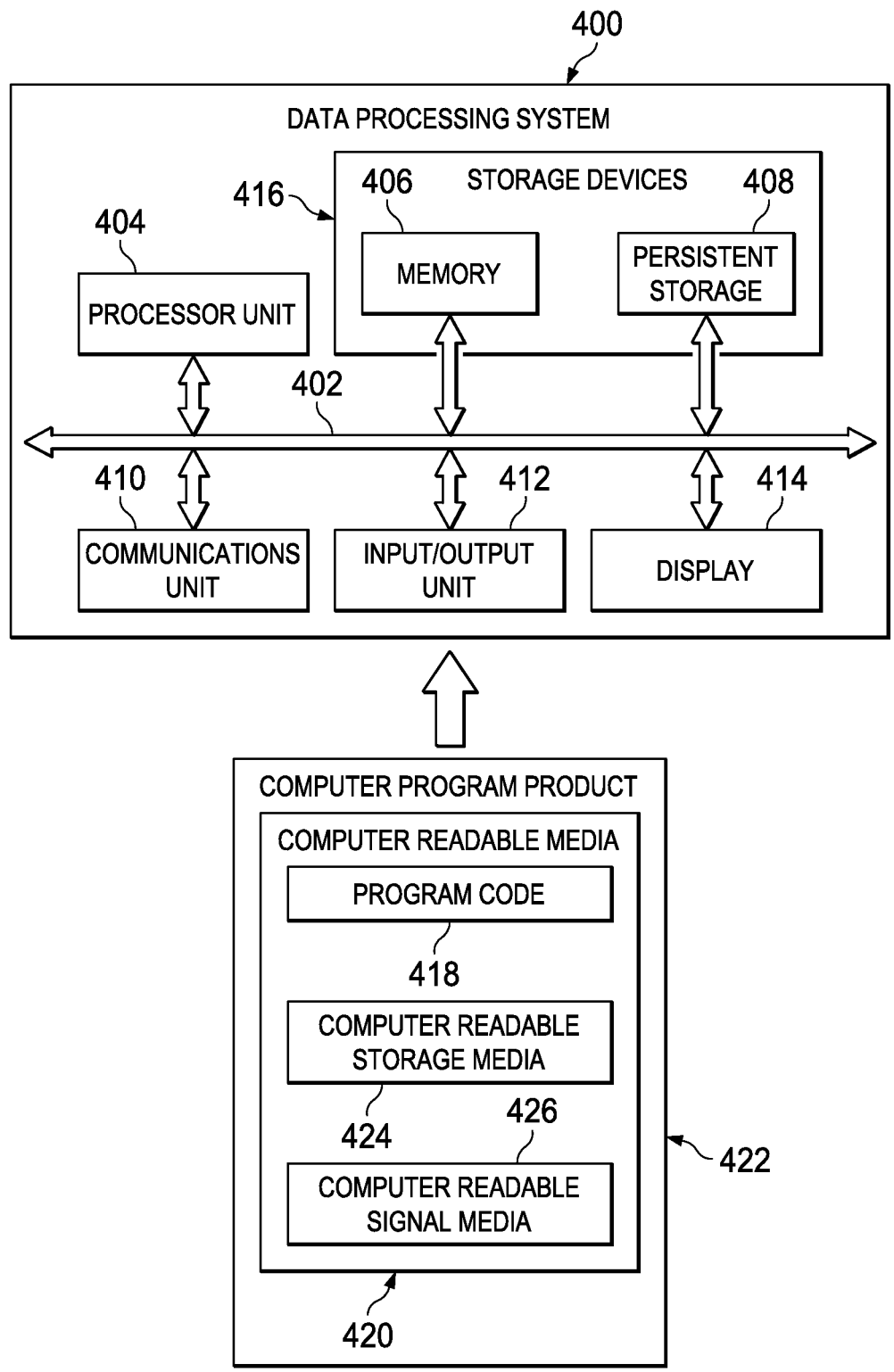
FIG. 4 is an illustration of a data processing system in accordance with an advantageous embodiment.

Turning now to FIG. 4, an illustration of a data processing system is depicted in accordance with an advantageous embodiment. In this example, data processing system 400 is an example of one implementation of data processing system 306 in FIG. 3, in which status diagnosis and presentation system 300 may be implemented. In this example, data processing system 400 includes communications fabric 402. Communications fabric 402 provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program instructions, program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these examples computer readable storage media 424 is a physical or tangible storage device used to store program code 418 rather a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another advantageous embodiment, processor unit 404 may be implemented using a combination of processors found in computers and hardware units. Processor unit 404 may have a number of hardware units and a number of processors that are configured to run program code 418. In this example, some of the processes may be implemented in the number of hardware units, while other processes may be implemented in the number of processors.

In another example, a bus system may be used to implement communications fabric 402. In this case, communications fabric 402 may be comprised of one or more buses, such as a system bus or an input/output bus. Of course, the bus system may be implemented using any suitable type of architecture that provides for a transfer of data between different components or devices attached to the bus system.

Additionally, communications unit 410 may include a number of devices that transmit data, receive data, or transmit and receive data. Communications unit 410 may be, for example, a modem or a network adapter, two network adapters, or some combination thereof. Further, memory 406 may comprise a cache, such as found in an interface and memory controller hub that may be present in communications fabric 402.

Examples of interactive graphical presentations for presenting the status of functions of a complex system are illustrated in FIGS. 5-9 in accordance with an advantageous embodiment. In these examples, the interactive graphical presentations of FIGS. 5-9 are examples of presentation 378 that may be generated by status diagnosis and presentation system 300 of FIG. 3 and presented to user 338. The example interactive graphical presentations of FIGS. 5-9 are for presenting the status of various functions, systems, and subsystems of an aircraft. The format and content of presentations in accordance with advantageous embodiments are not limited to the examples shown in FIGS. 5-9. The format and content of presentations of the status of any particular complex system will depend upon the particular complex system with which status diagnosis and presentation in accordance with advantageous embodiments is employed.

Figure 5:
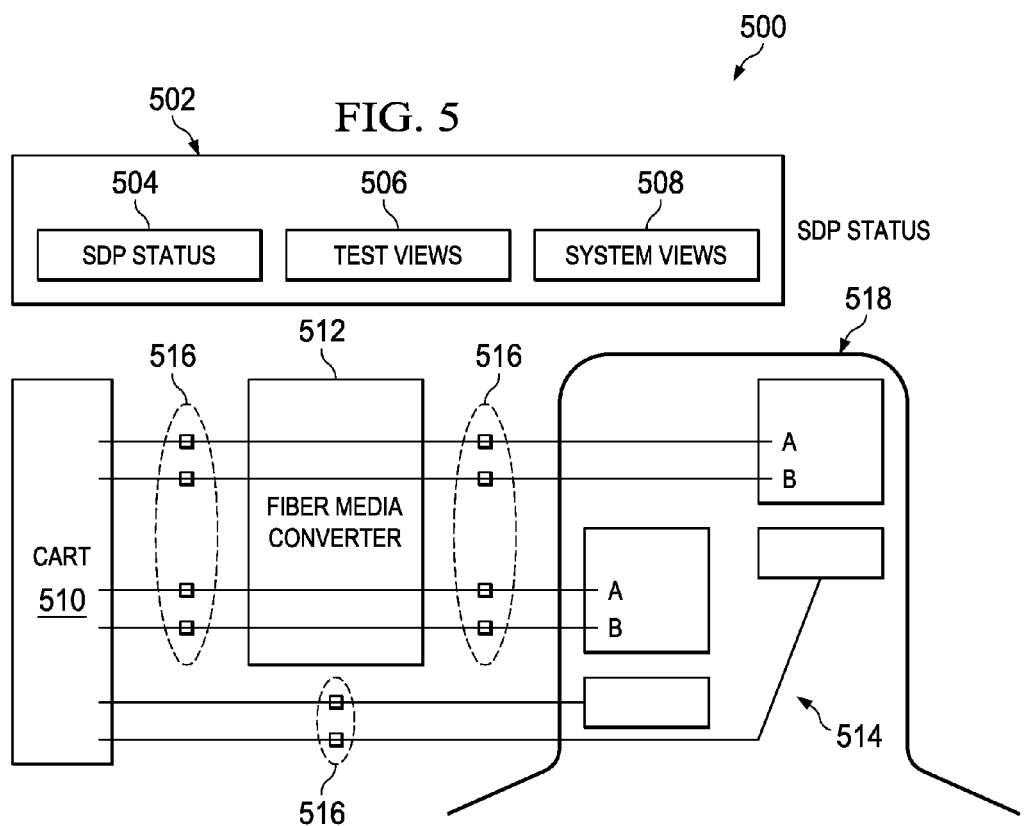
FIG. 5 is an illustration of a presentation of the status of a status diagnosis and presentation system in accordance with an advantageous embodiment.

Turning now to FIG. 5, an illustration of a presentation of the status of a status diagnosis and presentation system is depicted in accordance with an advantageous embodiment. In accordance with an advantageous embodiment, presentation 500 may include view selection menu 502. View selection menu 502 may allow a user to select from among different views for viewing the status of functions of a complex system. For example, a user may select SDP status button 504 to view the status of the status diagnosis and presentation system itself. A user may select test views button 506 to select from among different available test views. A user may select system views button 508 to select from among available system views.

In example presentation 500 shown in FIG. 5, SDP status button 504 has been selected by a user. Therefore, presentation 500 shows the status of various components of the status diagnosis and presentation system and the connection between the status diagnosis and presentation system and the complex system being evaluated. In this case, the complex system being evaluated is an aircraft.

In this example, presentation 500 shows status indicator 510 for showing the status of a cart, status indicator 512 for showing the status of a fiber media converter, status indicators 514 for showing the status of various aircraft systems, and status indicators 516 for showing the status of various connections. In this case, the status diagnosis and presentation system in accordance with an advantageous embodiment may be implemented on the cart. The fiber media converter provides an interface for the connections between the cart and the aircraft systems. Status indicators 514 for the aircraft systems may be presented with respect to aircraft outline 518 or another image of the aircraft being evaluated. The positions of status indicators 514 with respect to aircraft outline 518 may show the physical positions of the corresponding aircraft systems with respect to the aircraft being evaluated and to each other. In any case, the status of the various systems and connections shown in presentation 500 may be indicated using different colors for status indicators 510, 512, 514, and 516 to indicate different status Turning now to FIG. 6, an illustration of a presentation of a test view is depicted in accordance with an advantageous embodiment. View selection menu 502 of FIG. 5 may be included in presentation 600 shown in FIG. 6. In this case, a user has selected test views button 506. In response to selecting test views button 506, test views selection menu 602 may be displayed. Test views selection menu 602 may allow a user to select from among various different available test views.

For example, test views selection menu 602 may include number of buttons 604. Each one of buttons 604 may correspond to a different available test view. A user may select a test view by selecting one of buttons 604. In response to selecting a test view, a view selection may be sent to a network analyzer to determine the status of selected functions in the manner described above.

Figure 6:
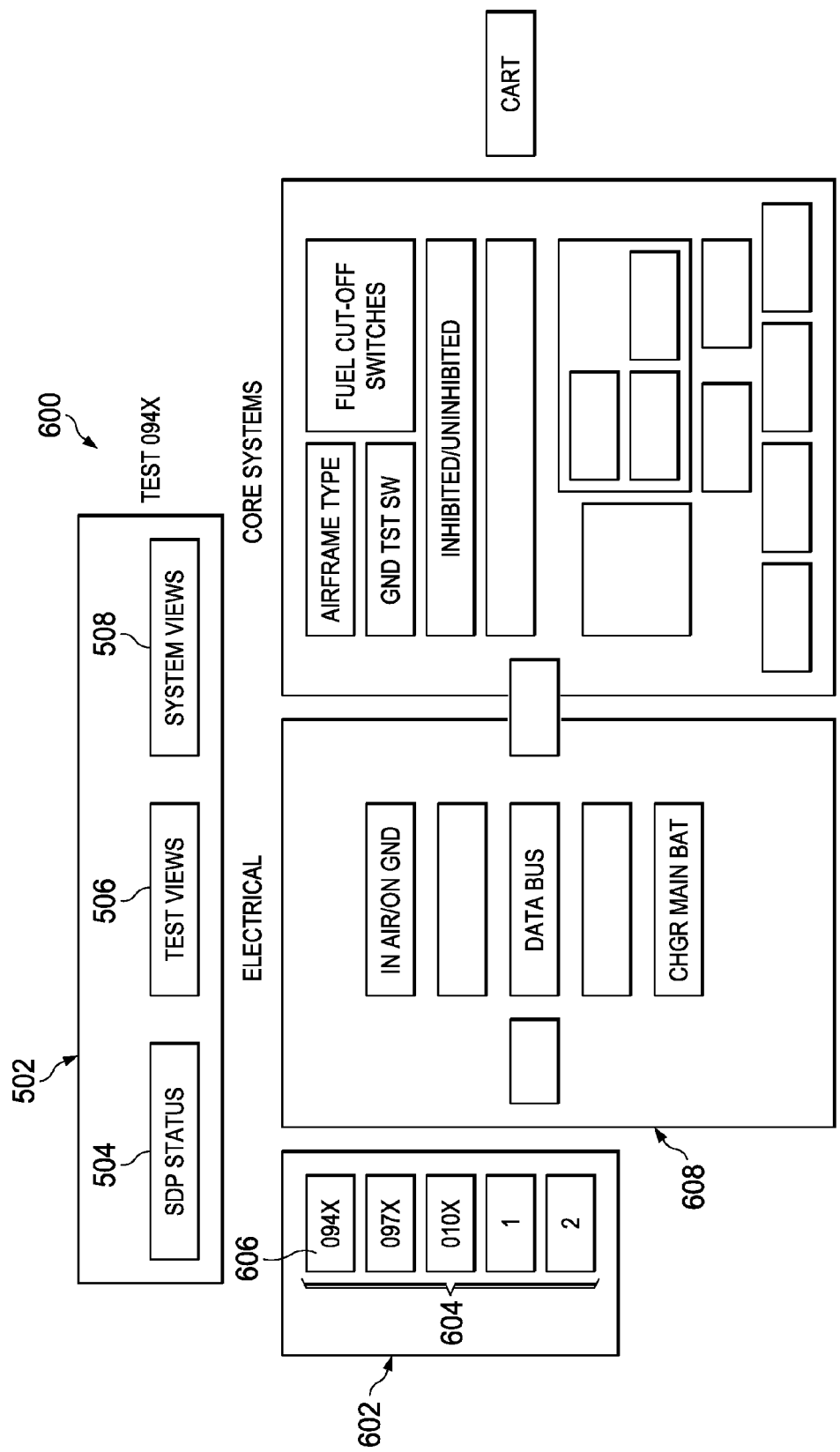
FIG. 6 is an illustration of a presentation of a test view in accordance with an advantageous embodiment.

In the example illustrated in FIG. 6, a user has selected button 606 for test 094X. User presentation 600 shows the status of various aircraft functions and systems as identified in the selected test view. The status of the various aircraft functions and systems may be represented as status indicators in the form of labeled blocks 608. The status of the functions and systems may be indicated by the colors of blocks 608 that represent those functions and systems.

Figure 7:
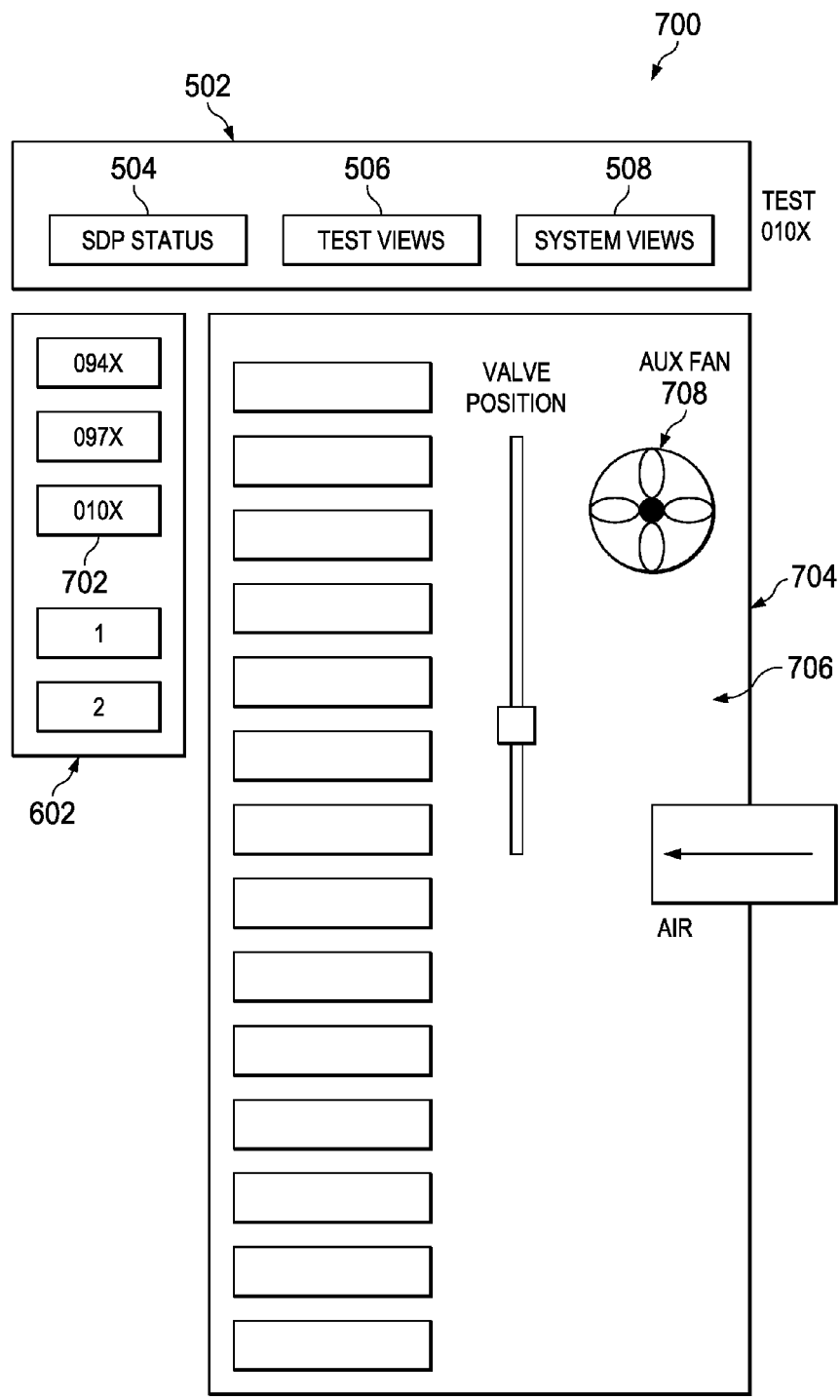
FIG. 7 is an illustration of a presentation of another test view in accordance with an advantageous embodiment.

Turning now to FIG. 7, an illustration of a presentation of another test view is depicted in accordance with an advantageous embodiment. View selection menu 502 of FIG. 5 and test views selection menu 602 of FIG. 6 may be included in presentation 700 shown in FIG. 7. In this case, the user has selected button 702 for test 010X in test views selection menu 602. Presentation 700 shows the status of various aircraft functions and systems as identified by the selected test view. The status of the various aircraft functions and systems may be indicated by status indicators in the form of labeled blocks 704 or representational graphics 706. Representational graphics 706 may represent a function or system with a pictorial representation. For example, representational graphic 708 may be used to represent an air fan function or system. The status of the functions and systems may be indicated by the colors of blocks 704 or representational graphics 706 that represent those systems.

Figure 8:
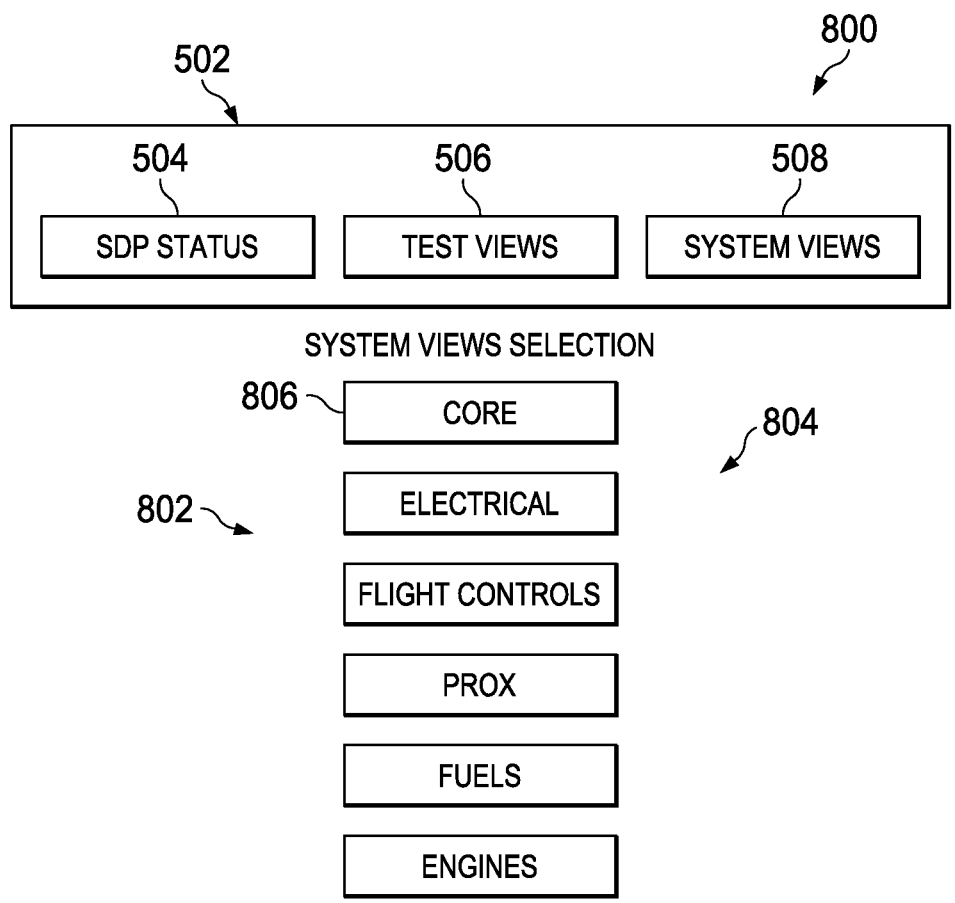
FIG. 8 is an illustration of a presentation of a systems view selection menu in accordance with an advantageous embodiment.

Turning now to FIG. 8, a presentation of a system views selection menu is depicted in accordance with an advantageous embodiment. View selection menu 502 of FIG. 5 may be included in presentation 800. In this case, the user has selected system views button 508 in view selection menu 502. In response, system views selection menu 802 is displayed. System views selection menu 802 may allow a user to select from among various different available system views. For example, system views selection menu 802 may include a number of buttons 804. Each one of buttons 804 may correspond to a different available system view. A user may select a system view by selecting one of buttons 804. In response to selecting a system view, a view selection may be sent to a network analyzer to determine the status of selected functions in the manner described above.

Figure 9:
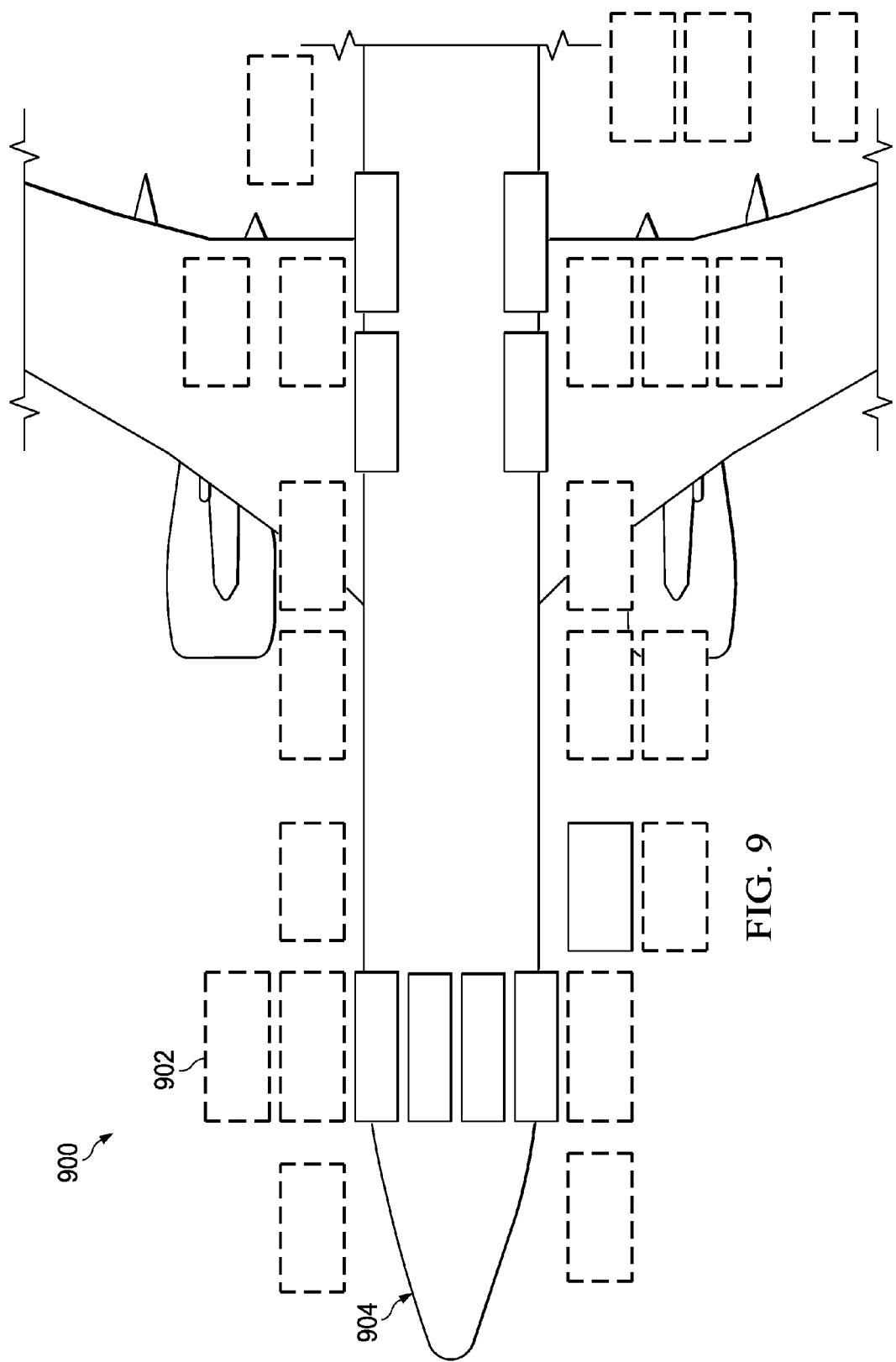
FIG. 9 is an illustration of a presentation of a system view in accordance with an advantageous embodiment.

Turning now to FIG. 9, a presentation of a system view is depicted in accordance with an advantageous embodiment. In this case, the user has selected CORE button 806 in system views selection menu 802 in FIG. 8. In response, presentation 900 shows the status of core systems of an aircraft. In this case, the status of systems is indicated by status indicators in the form of blocks 902. The status of the various systems may be indicated by the colors of blocks 902. Blocks 902 may be depicted with respect to outline 904 or another representation of an aircraft. The positions of blocks 902 with respect to outline 904 may indicate the physical positions of the corresponding systems with respect to the aircraft and to each other.

As just discussed, a user may make a view selection by selecting a view from a view selection menu, such as view selection menu 502 in FIG. 5, test views selection menu 602 in FIG. 6, or system views selection menu 802 in FIG. 8. Additionally, a user may make a view selection by selecting a status indicator in a displayed presentation. For example, a user may make a view selection by selecting one of status indicator blocks 608 in FIG. 6 or blocks 902 in FIG. 9. In response to making such a selection, a view selection may be sent to a network analyzer to determine the status of selected functions identified by the view selection. In this case, the view selection may identify functions of subsystems of a system that is represented by the status indicator block selected. When the status of functions for the new view selection is presented, the user may repeat the process by selecting a status indicator block in the new presentation to make a new view selection. Thus, a user may easily drill down into a complex system to determine the status of system functions at various levels in the complex system.

Figure 10:
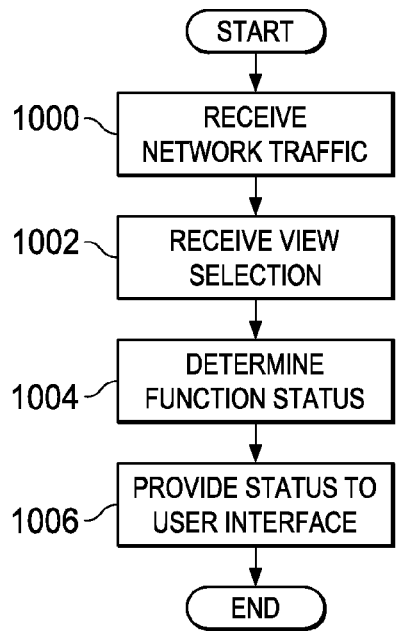
FIG. 10 is a flowchart of a process for diagnosis and status reporting in accordance with an advantageous embodiment.

FIG. 10 is a flowchart of a process for diagnosis and status reporting in accordance with an advantageous embodiment. The process illustrated in FIG. 10 may be implemented, for example, in network analyzer 334 of status diagnosis and presentation system 300 of FIG. 3.

The process begins by receiving network traffic (step 1000). Step 1000 may include receiving network traffic from a data network of a complex system. Network traffic may be placed on the data network by a number of systems of the complex system that may perform a number of functions for the complex system.

Next, a view selection is received (step 1002). For example, the view selection may be received from a user via a user interface. The view selection identifies rules for determining a status of selected ones of the number of functions of the complex system from the network traffic. For example, the view selection may identify a proper subset of the number of functions of the complex system for which status is to be determined. The view selection also may identify a state of operation of the complex system for which the status of the selected ones of the number of functions is to be determined.

The status of the selected ones of the number of functions then is determined (step 1004). Step 1004 may be initiated responsive to receiving the view selection. Step 1004 may include determining the status of the selected ones of the number of functions from the received network traffic using the rules. The determined status of the selected ones of the number of functions then may be provided to a user interface for presentation to a user (step 1006) with the process terminating thereafter. Step 1006 may include providing the determined status to the user interface in the form of status of functions data.

Figure 11:
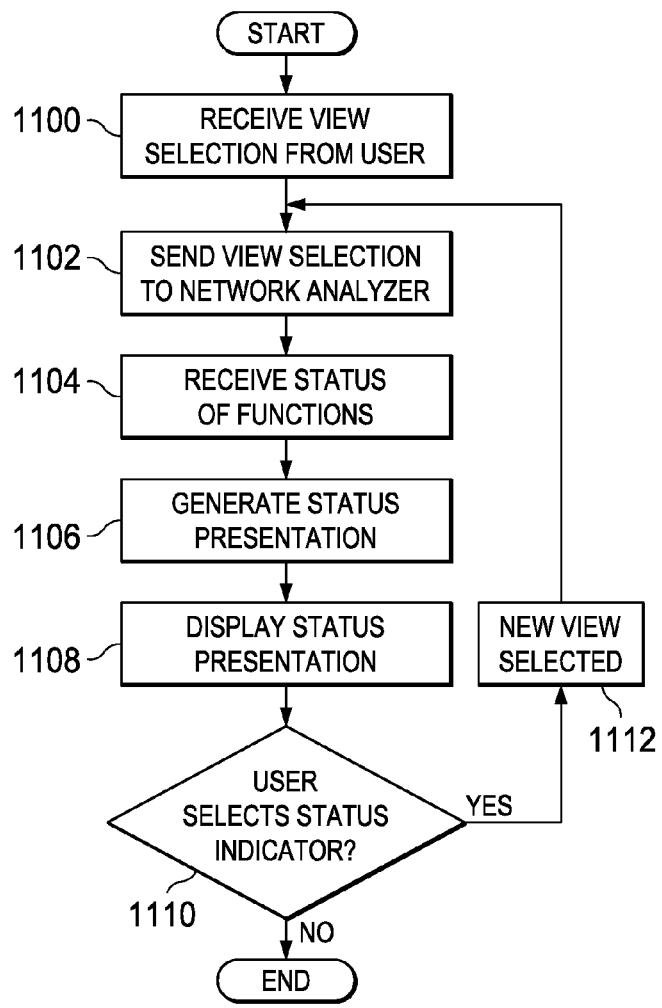
FIG. 11 is a flowchart of a process for status presentation in accordance with an advantageous embodiment.

FIG. 11 is a flowchart of a process for status presentation in accordance with an advantageous embodiment. FIG. 11 illustrates a process for presenting the status of functions at various levels in a complex system. The process illustrated in FIG. 11 may be implemented, for example, in user interface 336 of status diagnosis and presentation system 300 of FIG. 3.

The process begins by receiving a view selection from a user (step 1100). Step 1100 may include receiving the view selection via user interaction with a view selection menu presented on a user interface. The view selection is then sent to a network analyzer (step 1102). The network analyzer may determine the status of selected functions from network traffic using rules identified by the view selection.

The status of the selected functions is then received (step 1104). The status of the selected functions may be received in the form of status of functions data received from the network analyzer. A presentation of the status of the selected functions is generated (step 1106) and displayed (step 1108). For example, the presentation of the status of the selected functions may be generated from the received status of functions data. The presentation may present the status of the selected functions using coded status indicators as described above.

It then may be determined whether the user selects a status indicator from the displayed presentation (step 1110). If the user does not select a status indicator, the process may terminate. If it is determined that the user has selected a status indicator, a new view may be selected (step 1112). For example, a user may select from the displayed presentation a status indicator showing the status for a particular system of a complex system. This action may result in a new view selection. In this case, the new view selection may indicate that the status of various subsystems of the particular system is to be determined and presented. If a new view is selected, the process returns to step 1102 and the new view selection is sent to the network analyzer. Steps 1104-1108 may then be repeated, resulting in a display of a status presentation for the new view selection. A user may then select a status indicator in the new presentation to make yet another view selection to determine and present the status of a yet deeper level of functionality of the complex system being evaluated.

One or more of the advantageous embodiments provides a capability to determine and present the status of functions of a complex system by analyzing traffic on a data network of the complex system. For example, in accordance with an advantageous embodiment, the status of the functions of aircraft systems may be determined by collecting and analyzing data from an aircraft's common data network. Determined aircraft system function status may be presented to a user in a user-friendly visual synoptic manner. Advantageous embodiments allow a user to determine the status of aircraft system functions during aircraft assembly and maintenance, while the aircraft may be in a partially-assembled or partially-powered state. Other advantageous embodiments may be used to determine the status of system functions in network operation centers, process control centers, electrical control centers, and other complex systems.

Advantageous embodiments may provide a view of aircraft system functionality even before the aircraft displays can or will be powered up. Advantageous embodiments may be used to synthesize the expertise and knowledge of aircraft operational status and present a summary of the health of an aircraft for use by a mechanic on the factory or hanger floor.

Advantageous embodiments can provide primary savings in cost avoidance for system evaluation during final assembly or a major overhaul. The reduction of mean time to system evaluation in an aircraft during the assembly phase integration is an important factor in reducing overall production costs.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. A number, when referring to items, means one or more items. For example, a number of apparatus embodiments are one or more apparatus embodiments.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for system diagnosis and status reporting, comprising:

receiving, by a processor unit, network traffic from a data network comprising an aircraft data network on an aircraft, wherein the network traffic is placed on the data network by a number of systems comprising aircraft systems on the aircraft and wherein the number of systems perform a number of functions for a complex system comprising the aircraft;

receiving, by the processor unit, a view selection, wherein the view selection identifies rules for determining a status of selected ones of the number of functions from the network traffic;

responsive to receiving the view selection, determining, by the processor unit, the status of the selected ones of the number of functions from the network traffic using the rules; and providing, by the processor unit, the status of the selected ones of the number of functions to a user interface.

2. The method of claim 1, wherein the selected ones of the number of functions are a proper subset of the number of functions performed for the complex system.

3. The method of claim 1, wherein the view selection identifies rules for determining the status of the selected ones of the number of functions for a selected state of operation of the number of systems.

4. The method of claim 3, wherein the selected state of operation of the number of systems comprises a state of operation of the number of systems as power is applied initially to the number of systems.

5. The method of claim 1, wherein the rules comprise rules selected from a group of rules for determining the status of the selected ones of the number of functions from the network traffic consisting of:

rules for determining availability of selected data in the network traffic;

rules for determining content of the selected data in the network traffic; and rules for determining validity of the selected data in the network traffic.

6. The method of claim 1, further comprising:

filtering the network traffic received by the processor unit to obtain filtered network traffic, wherein the filtered network traffic comprises a portion of the network traffic that is relevant to determining the status of the selected ones of the number of functions; and determining the status of the selected ones of the number of functions from the filtered network traffic using the rules.

7. The method of claim 1, further comprising:

determining, by the processor unit, a change in the status of the selected ones of the number of functions from the network traffic using the rules; and responsive to a determined change in the status of the selected ones of the number of functions, automatically pushing a changed status of the selected ones of the number of functions to the user interface.

8. The method of claim 1, further comprising:

generating a presentation of the status of the selected ones of the number functions; and presenting the presentation on the user interface.

9. The method of claim 8, further comprising:

receiving, by the user interface, an interaction with the presentation whereby a user makes a second view selection, wherein the second view selection identifies second rules for determining a status of second selected ones of the number of functions from the network traffic;

sending the second view selection from the user interface to the processor unit;

receiving, by the processor unit, the second view selection;

responsive to receiving the second view selection, determining, by the processor unit, the status of the second selected ones of the number of functions from the network traffic using the second rules; and providing, by the processor unit, the status of the second selected ones of the number of functions to the user interface.

10. The method of claim 1, further comprising:

receiving, by the processor unit, a plurality of view selections, wherein each of the plurality of view selections identifies corresponding different rules for determining a status of corresponding different selected ones of the number of functions from the network traffic; and responsive to receiving the plurality of view selections, determining, by the processor unit, the status of each of the different selected ones of the number of functions from the network traffic using the corresponding different rules.

11. The method of claim 10, wherein the plurality of view selections are received from the user interface and further comprising providing the status of each of the different selected ones of the number of functions to the user interface.

12. The method of claim 10, wherein the plurality of view selections are received from a plurality of different user interfaces and further comprising providing the status of each of the different selected ones of the number of functions to a one of the plurality of different user interfaces from which the corresponding view selection is received.

13. An apparatus, comprising:

a network interface configured to receive network traffic from a data network comprising an aircraft data network on an aircraft, wherein the network traffic is placed on the data network by a number of systems comprising aircraft systems on the aircraft and wherein the number of systems perform a number of functions for a complex system comprising the aircraft; and a network analyzer connected to the network interface and configured to receive a view selection, wherein the view selection identifies rules for determining a status of selected ones of the number of functions from the network traffic, responsive to receiving the view selection, determine the status of the selected ones of the number of functions from the network traffic using the rules, and provide the status of the selected ones of the number of functions to a user interface.

14. The apparatus of claim 13, wherein the selected ones of the number of functions are a proper subset of the number of functions performed for the complex system.

15. The apparatus of claim 13, wherein the view selection identifies rules for determining the status of the selected ones of the number of functions for a selected state of operation of the number of systems.

16. The apparatus of claim 15, wherein the selected state of operation of the number of systems comprises a state of operation of the number of systems as power is applied initially to the number of systems.

17. The apparatus of claim 13, wherein the rules comprise rules selected from a group of rules for determining the status of the selected ones of the number of functions from the network traffic consisting of:

rules for determining availability of selected data in the network traffic;

rules for determining content of the selected data in the network traffic; and rules for determining validity of the selected data in the network traffic.

18. The apparatus of claim 13, wherein the network analyzer is further configured to
   filter the network traffic received by the network interface to obtain filtered network traffic, wherein the filtered network traffic comprises a portion of the network traffic that is relevant to determining the status of the selected ones of the number of functions, and
   determine the status of the selected ones of the number of functions from the filtered network traffic using the rules.

19. The apparatus of claim 13, wherein the network analyzer is further configured to
   determine a change in the status of the selected ones of the number of functions from the network traffic using the rules, and
   responsive to a determined change in the status of the selected ones of the number of functions, push automatically a changed status of the selected ones of the number of functions to the user interface.

20. The apparatus of claim 13, further comprising:
   a user interface connected to the network analyzer and configured to generate a presentation of the status of the selected ones of the number functions.

21. The apparatus of claim 20, wherein the user interface is connected to the network analyzer via a connection selected from a group of connections consisting of:
   a wired connection;
   a wireless connection;
   a network connection; and
   an Internet connection.

22. The apparatus of claim 20, wherein the view selection is received by the network analyzer from the user interface.

23. A computer program product for system diagnosis and status reporting, comprising:
   a computer readable storage medium;
   first program instructions to receive network traffic from a data network comprising an aircraft data network on an aircraft, wherein the network traffic is placed on the data network by a number of systems comprising aircraft systems on the aircraft and wherein the number of systems perform a number of functions for a complex system comprising an aircraft;
   second program instructions to receive a view selection, wherein the view selection identifies rules for determining a status of selected ones of the number of functions from the network traffic;
   third program instructions to determine the status of the selected ones of the number of functions from the network traffic using the rules, responsive to receiving the view selection;
   fourth program instructions to provide the status of the selected ones of the number of functions to a user interface; and
   wherein the first, second, third, and fourth program instructions are stored on the computer readable storage medium.

24. The computer program product of claim 23, wherein the selected ones of the number of functions are a proper subset of the number of functions performed for the complex system.

25. The computer program product of claim 23, wherein the view selection identifies rules for determining the status of the selected ones of the number of functions for a selected state of operation of the number of systems.

26. The computer program product of claim 25, wherein the selected state of operation of the number of systems comprises a state of operation of the number of systems as power is applied initially to the number of systems.

27. The computer program product of claim 23, wherein the rules comprise rules selected from a group of rules for determining the status of the selected ones of the number of functions from the network traffic consisting of:
   rules for determining availability of selected data in the network traffic;
   rules for determining content of the selected data in the network traffic; and
   rules for determining validity of the selected data in the network traffic.

28. The computer program product of claim 23, further comprising:
   fifth program instructions to filter the network traffic to obtain filtered network traffic, wherein the filtered network traffic comprises a portion of the network traffic that is relevant to determining the status of the selected ones of the number of functions;
   sixth program instructions to determine the status of the selected ones of the number of functions from the filtered network traffic using the rules; and
   wherein the fifth and sixth program instructions are stored on the computer readable storage medium.

29. The computer program product of claim 23, further comprising:
   fifth program instructions to determine a change in the status of the selected ones of the number of functions from the network traffic using the rules;
   sixth program instructions to automatically push a changed status of the selected ones of the number of functions to the user interface responsive to a determined change in the status of the selected ones of the number of functions; and
   wherein the fifth and sixth program instructions are stored on the computer readable storage medium.

30. A complex system, comprising:
   a number of systems, wherein the number of systems perform a number of functions for the complex system, the complex system comprising an aircraft;
   a data network connected to the number of systems, wherein the number of systems place network traffic on the data network, wherein the data network comprises an aircraft data network on the aircraft and the number of systems comprise aircraft systems on the aircraft;
   a network interface connected to the data network and configured to receive the network traffic from the data network;
   a network analyzer connected to the network interface and configured to receive a view selection, wherein the view selection identifies rules for determining a status of selected ones of the number of functions from the network traffic, and to determine the status of the selected ones of the number of functions from the network traffic using the rules, responsive to receiving the view selection; and
   a user interface connected to the network analyzer and configured to generate a presentation of the status of the selected ones of the number functions, wherein the view selection is received by the network analyzer from the user interface.

31. The complex system of claim 30, wherein the user interface is connected to the network analyzer via a connection selected from a group of connections consisting of:
   a wired connection;
   a wireless connection;
   a network connection; and
   an Internet connection.

* * * * *